(12) United States Patent
Stieglitz et al.

(10) Patent No.: US 8,580,005 B2
(45) Date of Patent: Nov. 12, 2013

(54) TRACTOR CAB AIR FILTER HOUSINGS

(75) Inventors: Andreas Stieglitz, Marktoberdorf (DE);
Hermann Geiss, Marktoberdorf (DE);
Alexander Zeller, Fussen (DZ)

(73) Assignee: AGCO GmbH, Marktoberdorf (DE)

( * ) Notice: Subject to any disclaimer, the term of this patent is extended or adjusted under 35 U.S.C. 154(b) by 236 days.

(21) Appl. No.: 13/125,878

(22) PCT Filed: Oct. 23, 2009

(86) PCT No.: PCT/EP2009/063965
§ 371 (c)(1),
(2), (4) Date: May 19, 2011

(87) PCT Pub. No.: WO2010/049357
PCT Pub. Date: May 6, 2010

(65) Prior Publication Data
US 2011/0214403 A1 Sep. 8, 2011

(30) Foreign Application Priority Data

Oct. 27, 2008 (GB) .................................. 0819558.8

(51) Int. Cl.
*B01D 46/00* (2006.01)
(52) U.S. Cl.
USPC .................. 55/378; 55/478; 55/505; 210/378
(58) Field of Classification Search
USPC .............................. 55/378, 478, 505; 210/378
See application file for complete search history.

(56) References Cited

U.S. PATENT DOCUMENTS 6,312,327 B1* 11/2001 Hachmann et al. ........... 454/158
2009/0211962 A1* 8/2009 Min et al. ...................... 210/378

FOREIGN PATENT DOCUMENTS

EP  0438076 A  7/1991
JP  58185312 A  10/1983

OTHER PUBLICATIONS

International Search Report for PCT International Application No. PCT/EP2009/063965 published May 6, 2010.
UK Search Report for GB Application No. GB0819558.8 dated Feb. 26, 2009.

* cited by examiner

*Primary Examiner* — Robert Clemente
*Assistant Examiner* — Karla Hawkins (57) ABSTRACT

A tractor cab filter housing (20) has at least one air intake (20a) through which air is drawn into the housing, an outlet (20c) through which air leaves the housing, a filter element (18) positioned between the inlet and outlet, and an opening access door (21) through which the filter element can be accessed for servicing/replacement. The housing access door (21) includes an integral storage chamber (21f) in which liquids or other items can be stored. The housing door is a hollow plastics molding having an access opening (21d) through which liquid can be introduced into the storage chamber, the opening having a cap (21e) for closing of the opening. A pump (50) may be provided for pumping the liquid out of the storage chamber.

7 Claims, 10 Drawing Sheets

TRACTOR CAB AIR FILTER HOUSINGS

TECHNICAL FIELD

This invention relates to tractor cab air filters housings for use in HVAC systems in which air to be distributed to the inside of the cab is drawn into the system by a blower of an HVAC via an air filter mounted in a filter housing.

BACKGROUND

The term "HVAC system" or "HVAC unit" as used throughout this patent application is to be interpreted as covering a system or unit which at its simplest simply draws air in via the filter and distributes this filtered air to the inside of the cab or a system or unit which additional heats and/or conditions the air which is drawn in via the filter.

It is desirable for the filter to be readily accessible in the housing for easy replacement or cleaning and this is done through an opening access door.

There is also an increasing need for storage space on modern tractors.

It is therefore an object of the present invention to provide a tractor cab filter housing which meets the above requirements.

Thus according to the present invention there is provided a tractor cab filter housing having at least one air intake through which air is drawn into the housing, an outlet through which air leaves the housing, a filter element positioned between the inlet and outlet, and an opening access door through which the filter element can be accessed for servicing/replacement, the housing being characterised in that the access door is a hollow plastics moulding which includes an integral storage chamber having an access opening through which liquid or other items can be introduced into the storage chamber, the opening having a closure member for closing of the opening.

A pump may be provided for pumping liquid out of the storage chamber. The pump may be partly recessed within an outer surface of the door for protection against damage.

The housing may be provided with an opening into the storage chamber through with tools or other items can be inserted into the chamber for storage The door may be detachable from the housing and is in two partially overlapping relatively slideable parts which, when the door is detached, can be slide apart to provide the access opening to the storage chamber within the door.

The two parts of the door may be held in an assembled partially overlapping configuration by interengaging formations on the two parts.

The two parts of the door may be initially formed in a single moulding operation, the parts then being cut apart and trimmed so that one part will slide inside the other part to provide the partially overlapping assembled configuration.

The access door is preferably formed by a blow moulding or rotation moulding process.

BRIEF DESCRIPTION OF THE DRAWINGS

The present invention will now be described, by way of example only, with reference to the accompanying drawings in which:—

DESCRIPTION OF EXAMPLE EMBODIMENTS

Figure 1:
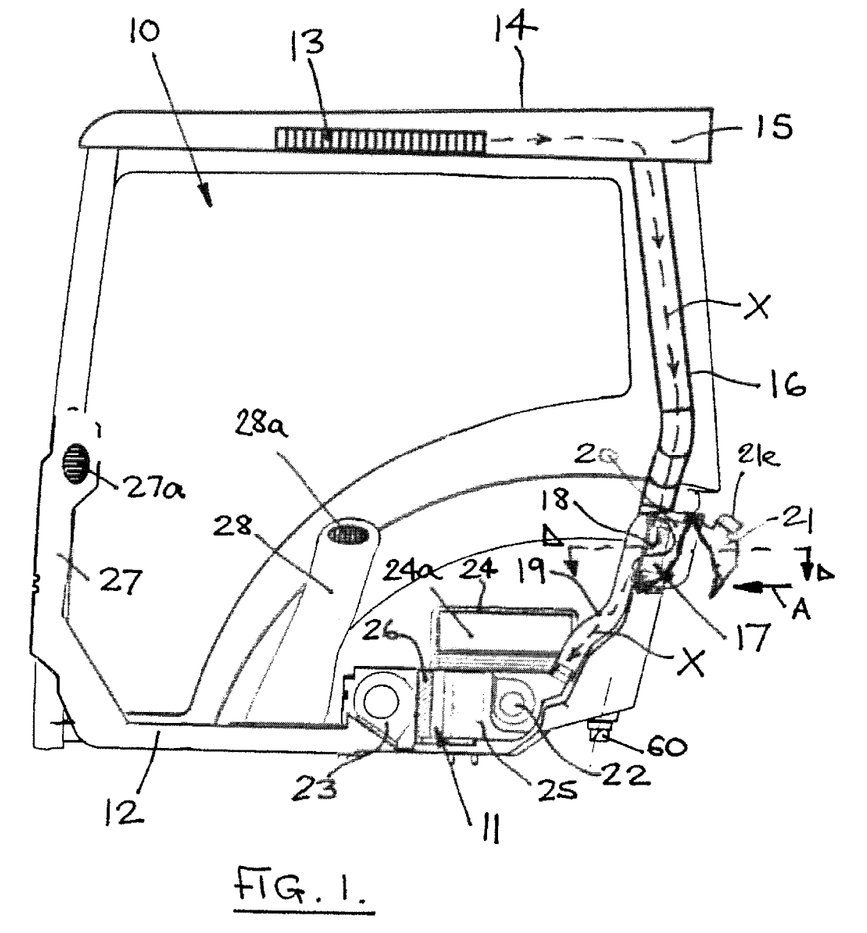
FIG. 1 shows a side view, partly in section, of a tractor cab having an air filter housing in accordance with the present invention.

Referring to the drawings a tractor cab 10 has an HVAC unit 11 mounted on the floor 12 of the cab. Air intakes 13 are provided in the sides of the roof 14 of the cab through which air is drawn into the HVAC unit 11 via ducts 15 in the roof and both rear pillars 16 of the cab and through a fresh air filter unit 17 which contains a filter element 18 into a duct 19 connected with the intake of the HVAC unit 11. A cross member 100 extends between pillars 16. By drawing air into the system via intakes 13 in the roof the level of dust and dirt in the intake air is minimised. The air flow from intakes 13 to the HVAC unit 11 is shown by the dotted line paths X in FIGS. 1 and 2.

The air enters filter unit 17 generally horizontally from both sides. The air filter unit has a housing 20 provided with an opening access door 21 enabling the operator to access the filter element 18 for maintenance or renewal.

Figure 6:
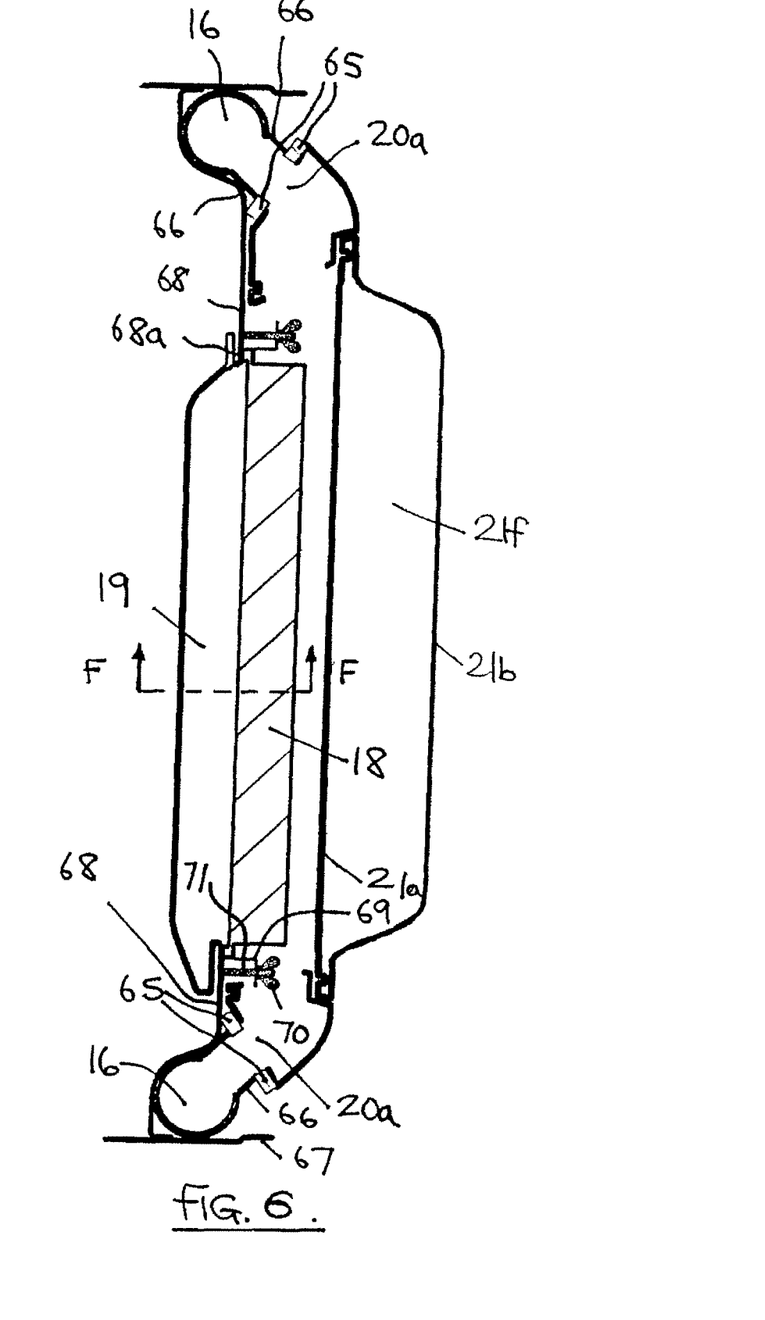
FIG. 6 shows a section on the line D-D of FIG. 1.
Figure 7:
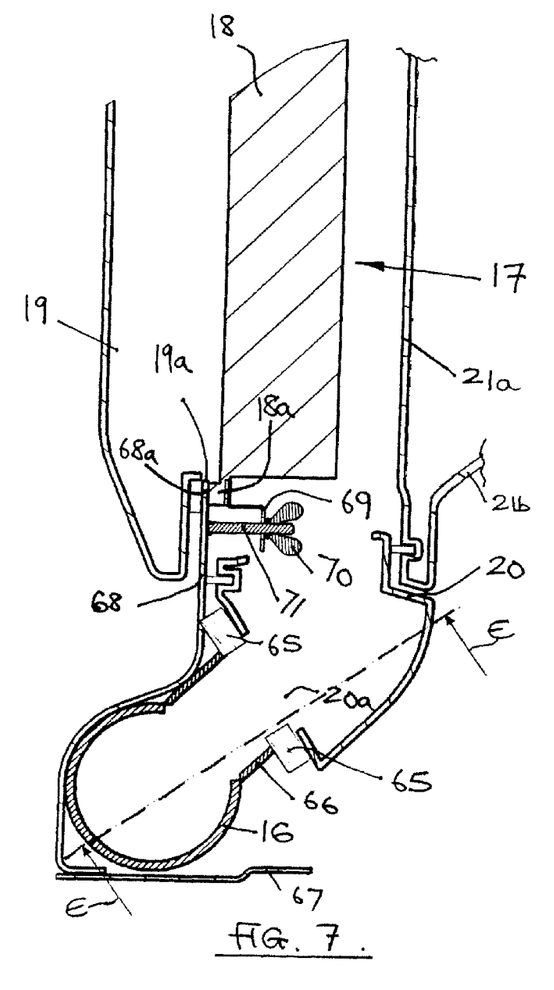
FIG. 7 shows part of FIG. 6 on a larger scale.

The filter housing 20 which has an inlet opening 20a (see FIGS. 6 to 8) which is sealed at 65 to an outlet 66 provided in the adjacent cab pillar 16. The structural pillar 16 is surrounded by sheet metal or plastics panel work 67 which includes a rear external panel 68 of the cab. The air filter 18 includes a peripheral sealing area 18a which is clamped against a portion 68a of the rear panel 68, which surrounds an output aperture 19a formed in the rear panel 68 of the cab, by a frame 69 and an associated wing nut 70 which engages bolts 71 welded to the rear panel 68. Aperture 19a leads to duct 19. Filter housing 20 is secured to the rear panel 68 of the cab using bolt holes 20h.

Figure 9:
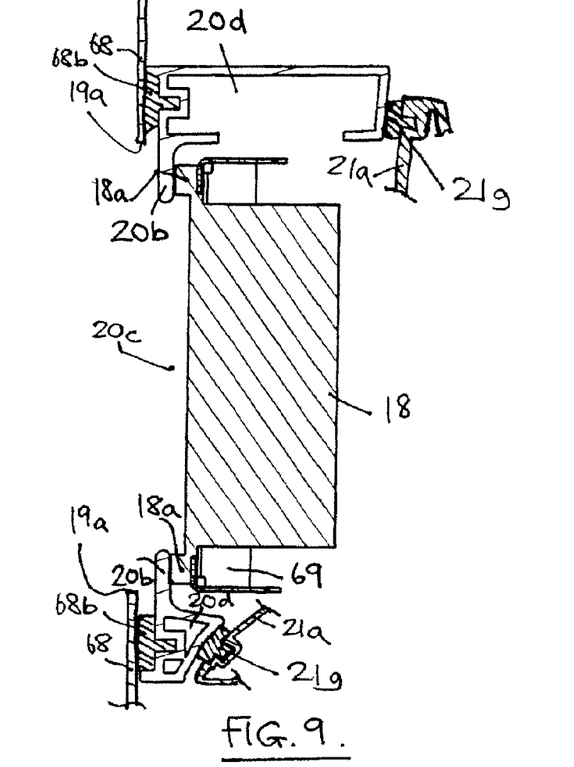
FIG. 9 shows a section on line similar to line F-F of FIG. 6.
Figures 10, 11, 12, 13:
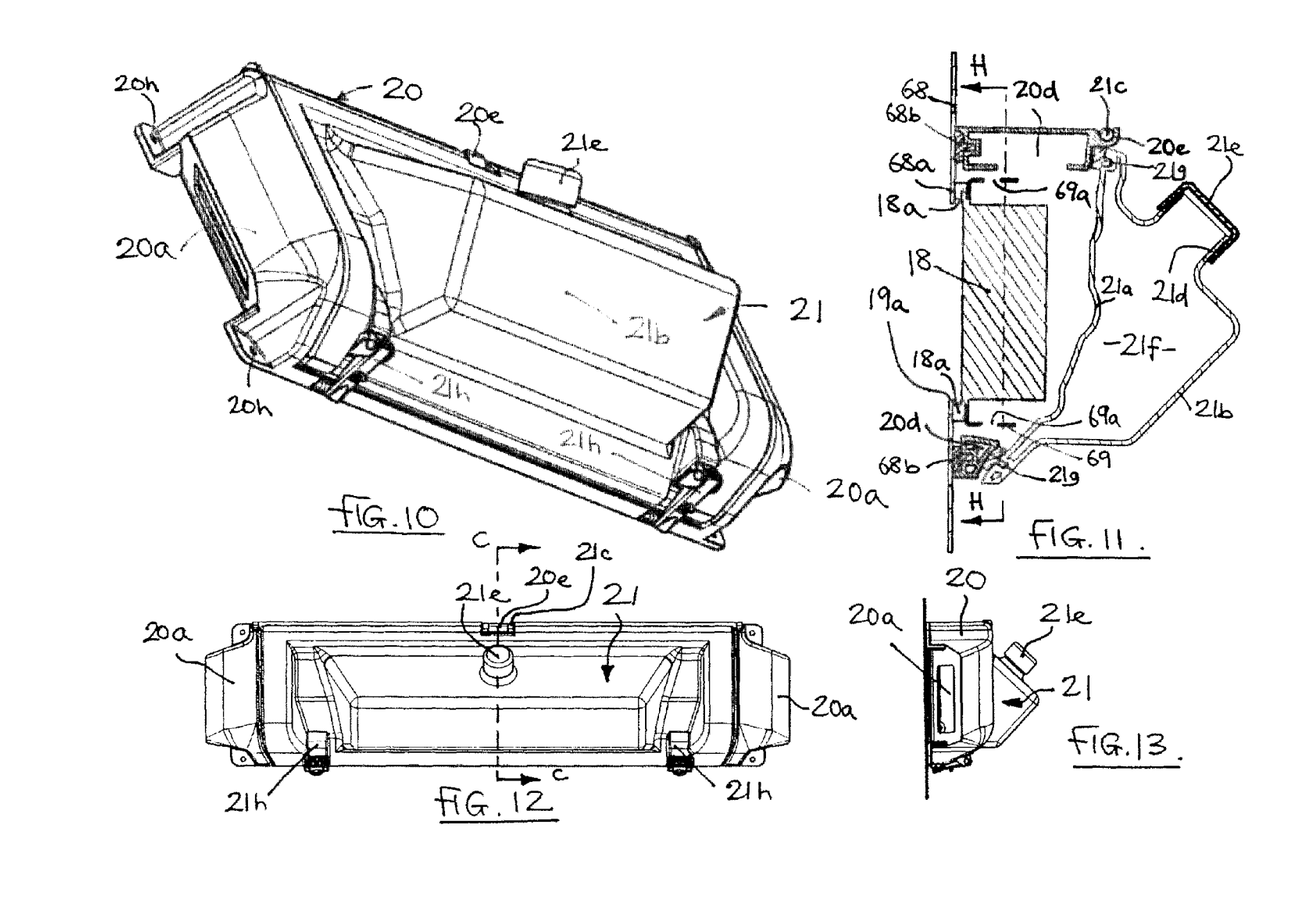
FIG. 10 shows a perspective view of a filter housing having a hollow access door in accordance with the present invention.
FIG. 11 shows a section on the line C-C of FIG. 12.
FIGS. 12 and 13 show side and end views of the door of FIG. 10.

In an alternative arrangement, shown in FIG. 9, the filter 18 is clamped against a filter mounting surface 20b which surrounds an output aperture 20c in the housing 20 leading to duct 19.

The HVAC unit 11 includes a pressurization blower 22 to overcome the pressure drop caused by the long air intake path X, which is somewhat restrictive due to being narrow and including various bends. A main blower 23 is also provided to push air from the HVAC unit 11 into the cab, to draw air through an evaporator 25 and a heater core 26, and to suck air into the unit via recirculation ducts 24 via path Y. Main blower 23 is not provided to suck the air into the HVAC unit along intake path X. Without the pressurization blower 22, the air flow from the HVAC unit would be too small for reasonable system performance.

The heater core 26 is provided with an electronically controlled valve (not shown) for regulating the mass flow and therefore the heating performance of the heater core 26. The evaporator is also equipped with an evaporator valve (not shown) for vapourizing the refrigerant. Additionally the overall control unit for the HVAC system can be housed within a housing 40 of the HVAC unit 11. The HVAC unit 11 also has an external central electric connector for all the electrical connections of the unit thus providing easy plug and play installation of the HVAC unit.

The main blower 23 distributes air from the HVAC unit to a front distributor 27 to provide air to defrost/defog the front screen and front windows of the cab and also provide processed air for the driver. Fender distributors 28 on the left and right fender provide air to the side windows of the cab and also to the side of the driver. All these distributors 27 and 28 are equipped with nozzles 27a and 28a respectively to control the air distribution within the cab. These nozzles can be adjustable and/or closed by hand.

Figure 3:
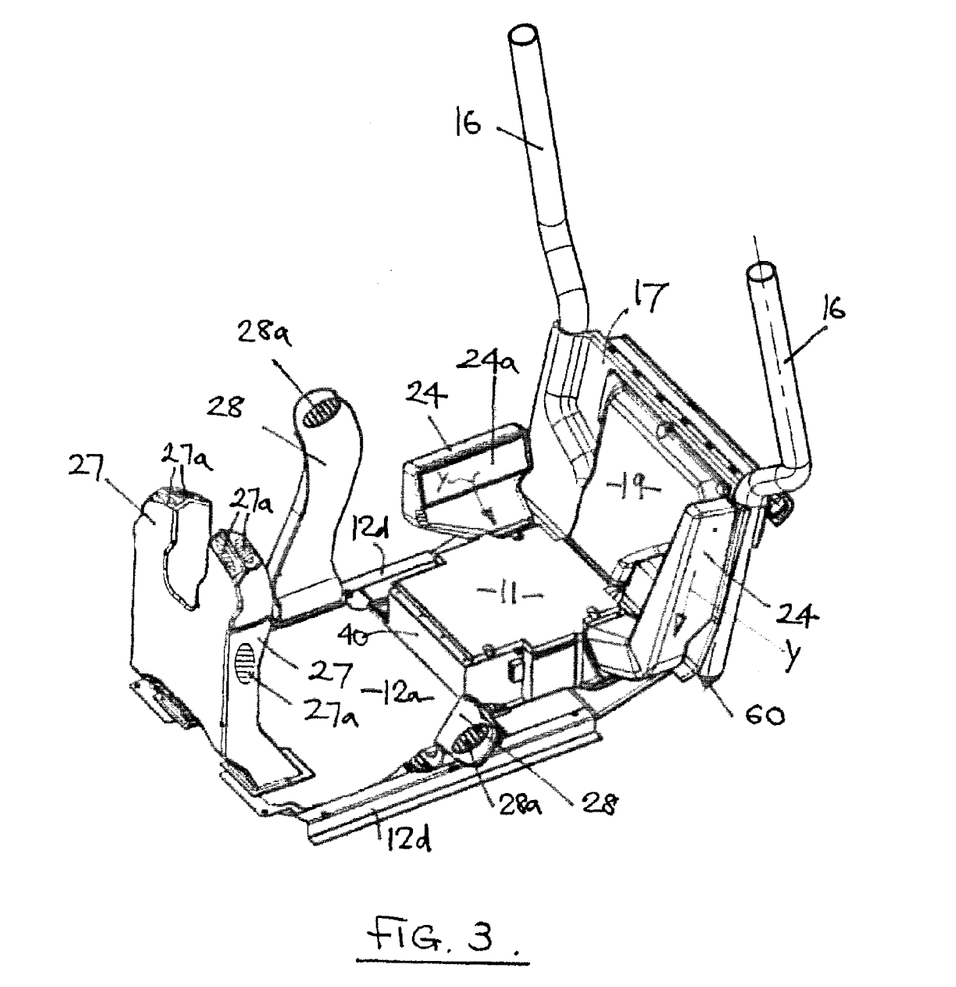
FIG. 3 shows a perspective view of part of the lower part of the cab of FIG. 1.
Figure 4:
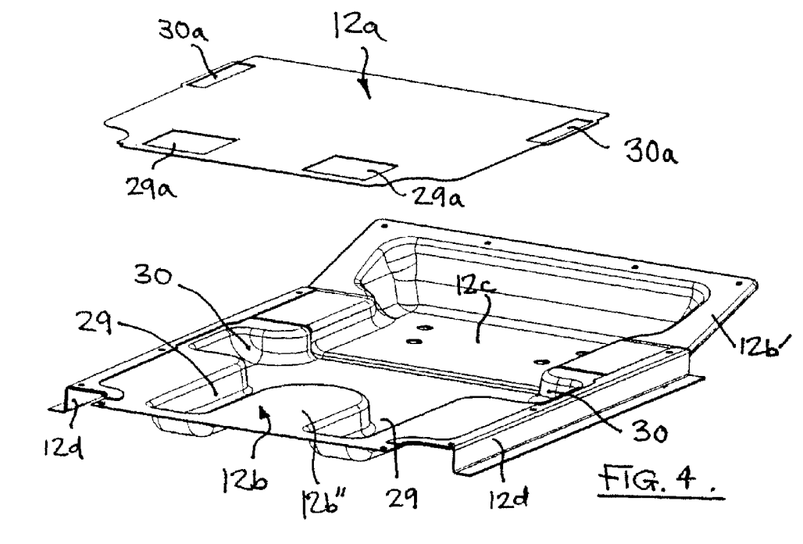
FIG. 4 shows an exploded perspective view of the two layer cab floor.

In accordance with the Applicant's co-pending UK Patent Application No. [Applicant's Reference 7887], the HVAC unit 11 is connected with the distributors 27 and 28 by cavities in the form of passages 29 and 30 formed in the hollow floor 12 of the cab (see FIG. 4). It is a main task of these passages in the floor to transport the air from the HVAC unit with a minimum of pressure drop and noise emission. The floor 12 comprises an upper layer 12a and a lower layer 12b which are welded and sealed together to provide the necessary structural integrity of the floor and to seal the sides of the passages 29 and 30 (see FIG. 6). The HVAC unit 11 is mounted in a recess 12c provided in the rear portion 12b' of the lower layer 12b of the floor. As most clearly visible in FIG. 4, the rear portion 12b' of the lower layer 12b of the floor is a separate component which is welded or otherwise secured to the front portion 12b" of the lower layer. This facilitates manufacture of the lower layer 12b. Flanges 12d are welded or otherwise secured to the sides of lower layer 12b for securing the floor of the other structural portions of the cab. The upper layer 12a has outlets 29a and 30a which connect passages 29 and 30 with distributors 27 and 28 respectively as shown in FIGS. 3 and 4.

The floor layer 12a and 12b may be made from steel sheets which or can be made from reinforced plastics material which is glued or otherwise secured together.

The cavities formed between the floor layers 12a and 12b can also or alternatively be used to run electric wiring or hydraulic pipes or hoses through and/or for the storage of fluids such as screen washer liquid. One or more access hatches are provided in the upper layer 12a of the floor to give access to the cavity between the floor layers. These hatches are accessible via access flaps in a rubber mat (not shown) which extends over the upper layer 12a of the floor.

Figure 5:
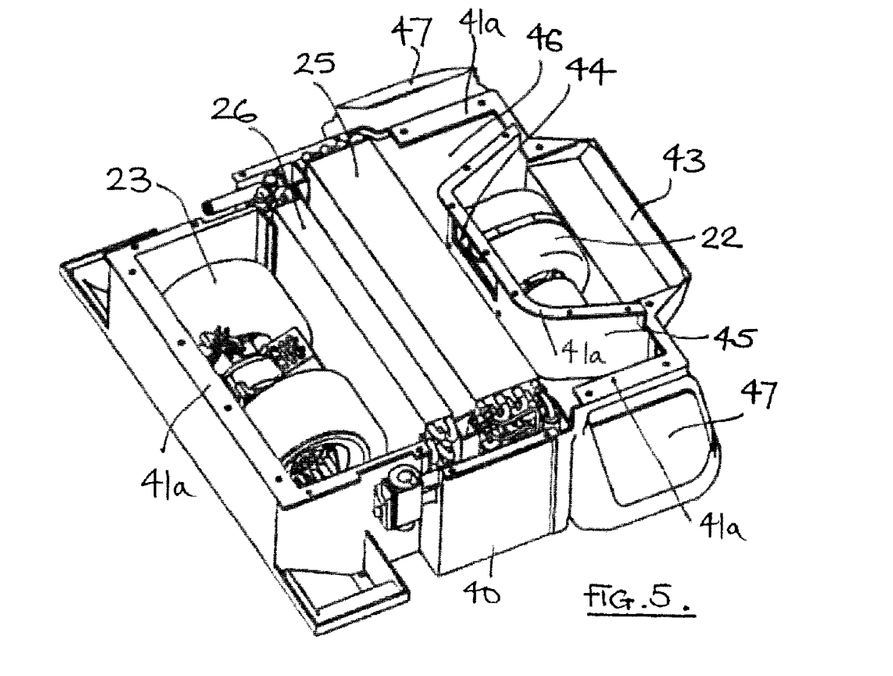
FIG. 5 shows a perspective view of a HVAC unit used in conjunction with the air filter of the present invention with its cover removed for clarity.

The HVAC unit 11 housing 40 is preferably injection moulded and has a lower part 41 and a cover (which is removed in FIG. 5) and which is secured to a peripheral flange 41a on the lower part 41 of the housing 40.

The fresh air from filter unit 17 is drawn into the HVAC unit 11 via fresh air intake 43 by the pressurization blower 22 and pushed, via an aperture 44 in a partition wall 45, into a reservoir chamber 46 which is placed ahead of the evaporator 25.

Due to the suction effect caused by main blower 23, air is also sucked via recirculation intakes 47 in the housing 40 on both sides of the HVAC unit 11 into the reservoir chamber 46. Recirculation intakes 47 are connected with ducts 24.

Both fresh air and also recirculation air are sucked into the HVAC unit in order to improve the performance of the system by reducing the time to reach the cab temperature set-point.

Also, in an area with unpleasant odours recirculation air is chosen to reduce smell nuisance.

Each duct 24 is provided with the recirculation air filter element 24a is placed to the side of the cab seat near the fenders. These filters must also be readily removeable for maintenance.

The fresh air and recirculation air flows, are mixed in the reservoir chamber 46 and then sucked through evaporator 25 and heater core 26. Depending on the mode or set-point of the cab temperature, heater core 26 or evaporator 25 is heating up or cooling down the air stream. Finally, the main blower 23 pushes the HVAC output air to the distributors 27 and 28.

The ratio between fresh air and recirculated air in this embodiment is mainly regulated (in a new condition without significant filter load) by the ratio of the speeds of the pressurization blower 22 and the main blower 23. If the pressurization blower 22 is switched off or is not operating, a main blower 23 with sufficient performance can still be capable of sucking in fresh air. Thus the system can still meet the legal requirement to add fresh air to the cab in certain conditions to ensure air quality (to avoid suffocation and to control the CO ratio). The use of two blowers ensure that, even if the filter is very dirty and the pressure drop is increasing, adequate air exchange can still be obtained.

Any water, dust and other debris which has been drawn into the roof rear pillars 16 can be emptied from the lower ends of the rear pillars via rubber/plastics sealing valves or teats 60 (see FIG. 8) which have flaps 61 which define a slot 62 therebetween and which are normally drawn towards each other by the low pressure created within the pillars to seal the lower ends of the pillars during use of the HVAC system.

Figure 2:
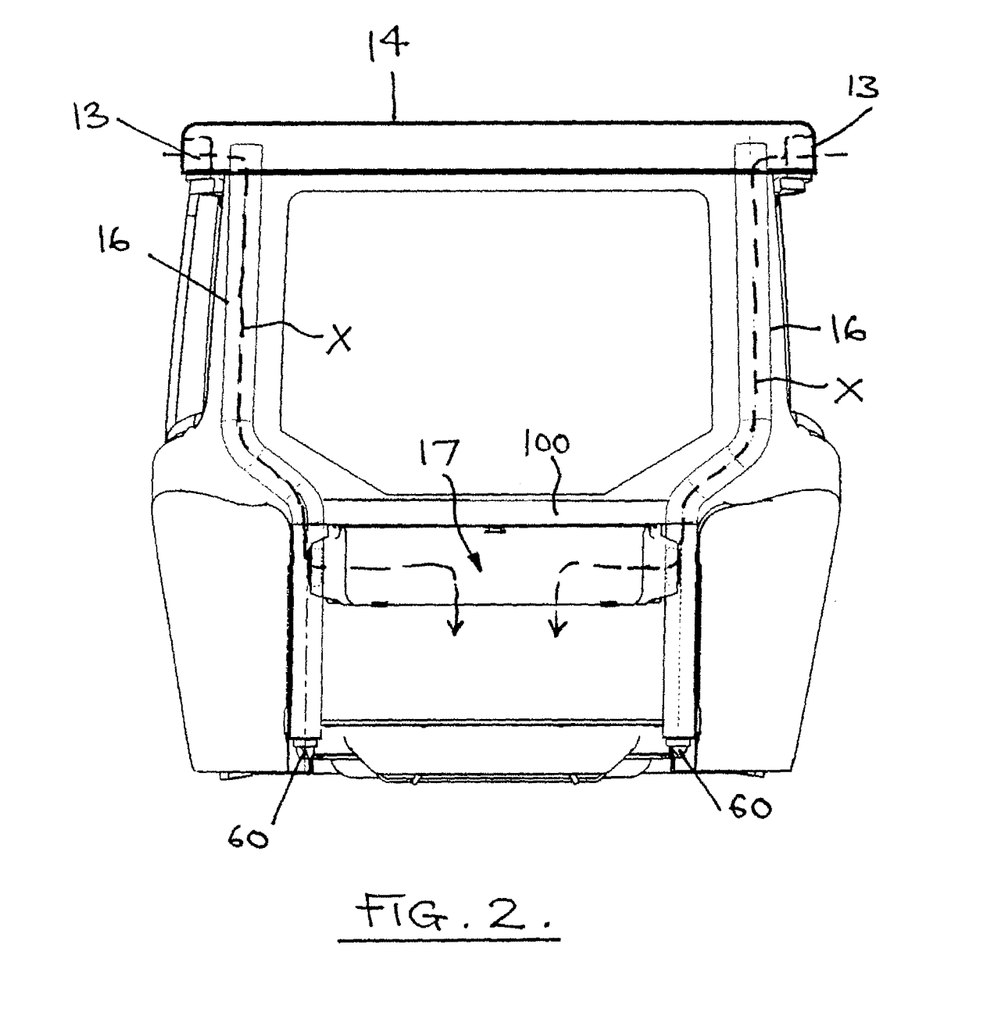
FIG. 2 show a rear view of the cab of FIG. 1.
Figure 8:
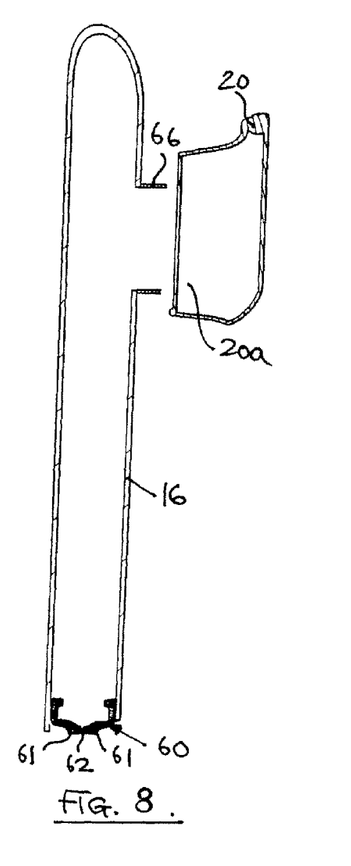
FIG. 8 shows a section on line E-E of FIG. 7.

As can be seen from FIGS. 2 and 8, the air flow travels down the pillars 16 and executes a right angle turn as it enters the filter housing. Thus any water drops, dust or other debris which is in this air stream is relatively dense compared to the air and therefore tends to carry straight-on past the entry into the filter housing and to collect in the lower ends of the pillars above the flaps 61 of the sealing teats/valves 60. If the weight of water, dust or other debris resting on the teats/valves 60 is exceeding a certain level, or overpressure of the cab occurs due to slamming of the door, the slots 62 between the flaps 61 are opened and thus the water, dust or other debris is flushed or discharged. Alternatively, to empty this water, dust or debris the tractor operator simply squeezes the rubber/plastic sealing teats to open the slots 62 between the flaps 61 and allow the water, dust and debris to fall from the pillars.

In an alternative construction (not shown) the lower ends of the pillars 16 may be closed-off by spring loaded pivoting flaps (instead of the teats 60) which are again opened either manually, or by the weight of the water, dust or debris which has collected above the flaps, or by over pressurisation of the cab when the cab door is slammed.

Aperture 19a leads to duct 19. Seals 68b are provided between the housing 20 and the rear panel 18.

Figure 21:
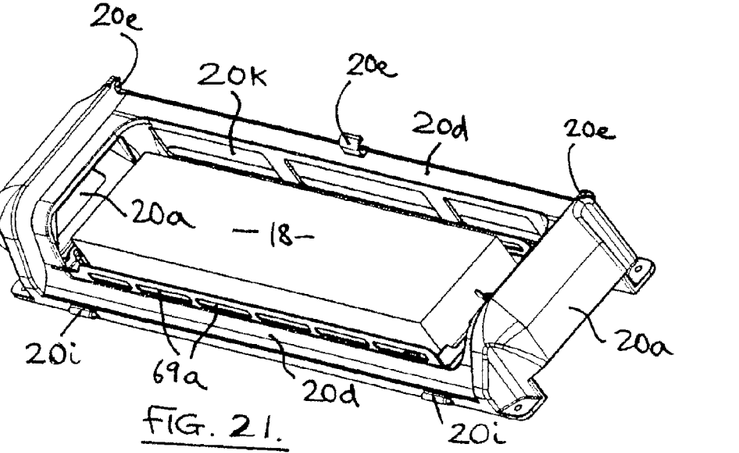
FIG. 21 shows a perspective view of the filter housing with the access door removed.

The hollow chambers 20a are structurally connected by hollow side portions 20d of the housing (see FIG. 21) which include apertures 20k so that the housing can be formed as a single piece plastics moulding by, for example, a blow moulding technique as described and claimed in the Applicants co-pending UK Patent Application No. [Applicants Reference 7889]. This provides a relatively cheap to produce housing which is light in weight and which has the necessary rigidity. Apertures 20k and 69a in frame 69 ensure good air flow around and towards the filter element 18.

Similarly, in accordance with the present invention, the access door 21 of the housing is also a hollow plastics moulding within which liquid or other items can be stored. FIGS. 10 to 13 show a first form of access door 21 which has inner and outer walls 21a and 21b which include integral pivots 21c which snap into pivot housings 20e formed integrally with the housing. The snap-in design also allows quick disassembly of the access door 21 if the opening angle is limited by certain installations in the rear of the tractor (e.g. upper link of the three point hitch, hydraulic valve assembly) or the access door is used to transport, liquid not for use on the tractor. The access door 21 is also provided with a filler neck 21d and filler cap 21e through which fluid (e.g. rear cab window washing liquid) can be introduced into the internal chamber 21f within the door 21. Door 21 is sealed to the housing 20 by a peripheral seal 21g. The door 21 is held in its closed position by catches 21h which engage lugs 20i.

Figure 14:
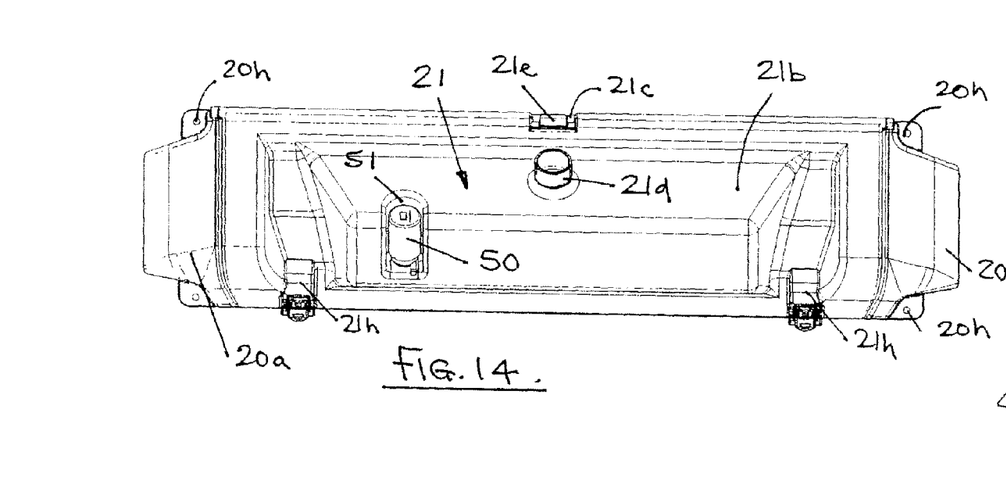
FIGS. 14 and 15 show side and sectional views of an alternative door arrangement with a recessed motor.
Figure 15:
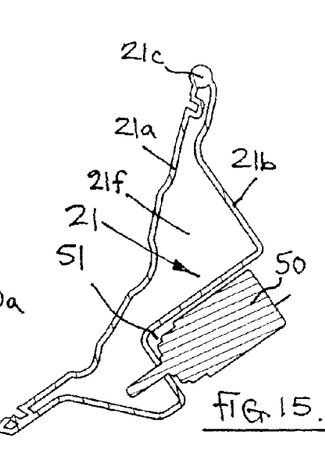

FIGS. 14 and 15 show an alternative access door 21 in which an electric pump 50 is mounted in a recess 51 to protect the pump. The pump is used to pump the window washing liquid from the chamber 21f.

Figure 16:
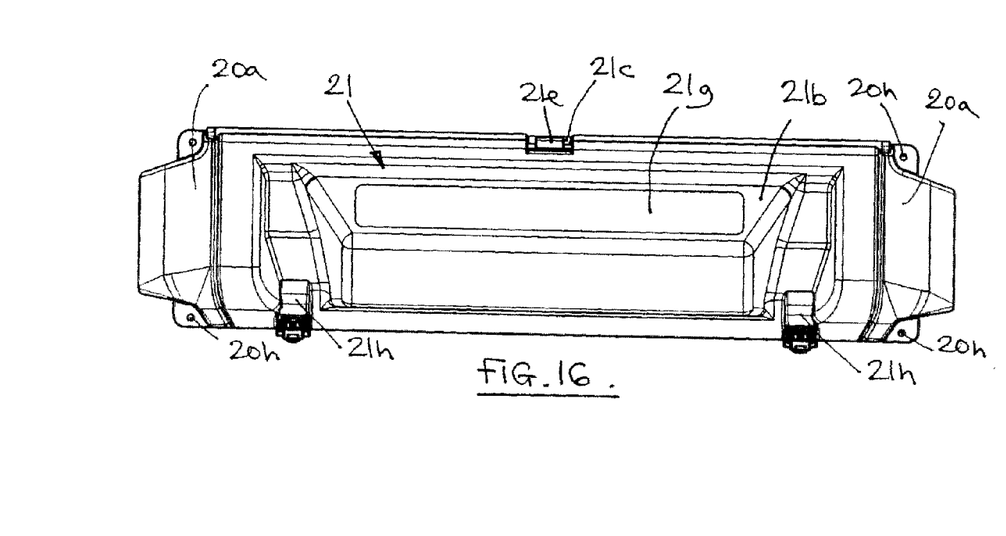
FIGS. 16 and 17 show side and sectional views of a further alternative door arrangement with an opening for the insertion of items to be stored.
Figure 17:
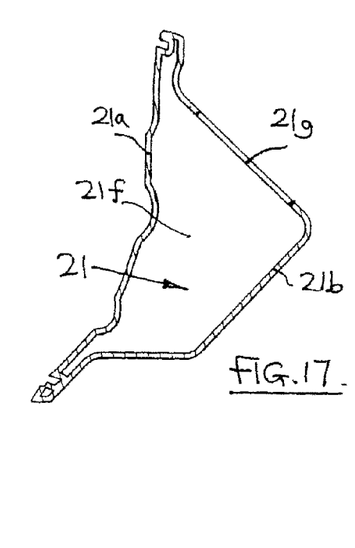

FIGS. 16 and 17 show a further alternative form of access door 21 in which the outer wall 21b is provided with an aperture 21g through which items such as tools can be inserted inside the chamber 21f in door 21 for storage.

Figure 18:
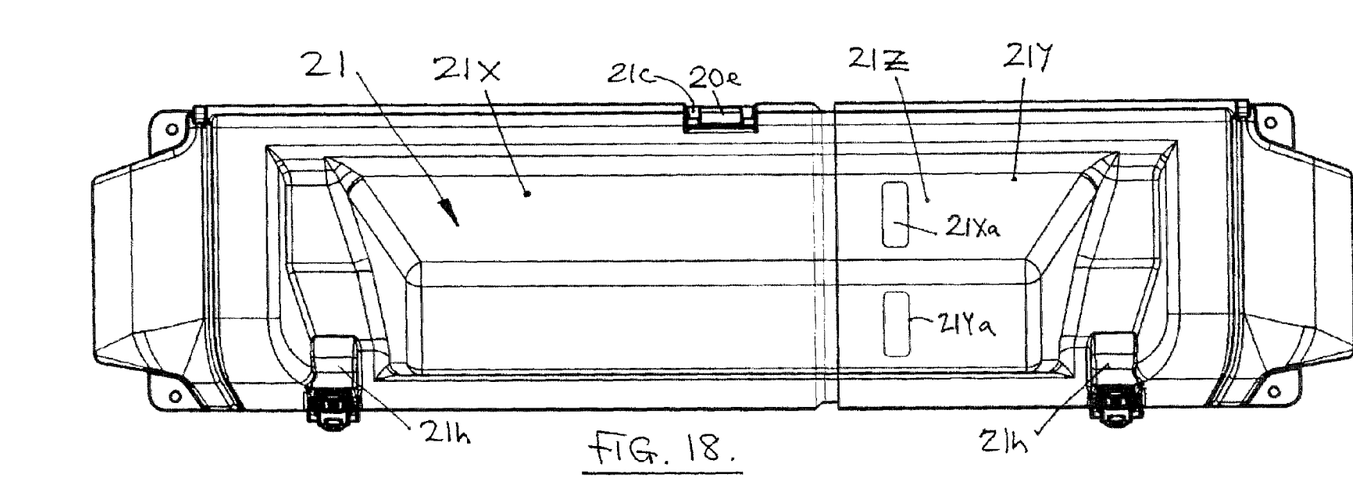
FIGS. 18 to 20 show details of yet further two part door arrangement in which the parts can be slid apart after the door has been demounted.
Figure 19:
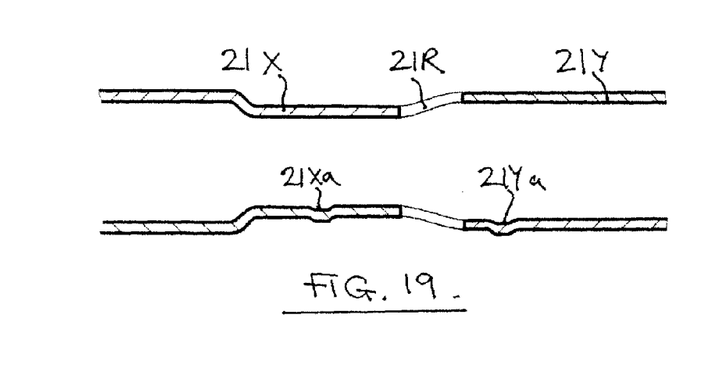
Figure 20:
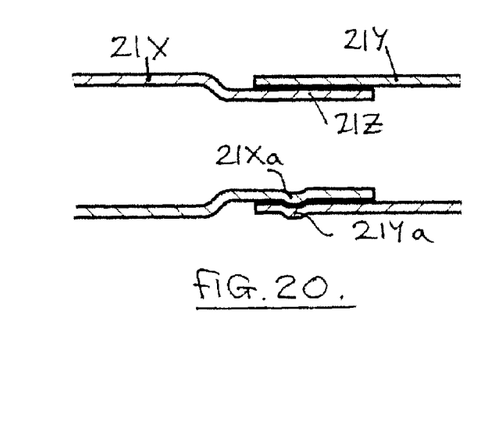

A yet further form of door 21 is shown in FIGS. 18 to 20. In this construction the door is in two parts 21X and 21Y which partially overlap each other in region 21Z. The door 21, when demounted from the pivot housings 20e, can be slide apart to give access to the interior of the door within which less frequency used items and other emergency items or tools can be stored. The two housing parts 21C and 21Y are held together by interengaging formations 21Xa and 21Ya respectively.

FIG. 19 shows how parts 21X and 21Y can initially be moulded as a single part and then cut into the two separate parts 21X and 21Y by removing the portion 21R of the moulding. The parts can then be slid into their overlapping configuration as shown in FIG. 20.

As indicated above, the housing 20 and door 21 are designed so that they can both be formed by blow moulding. Blow moulding, sometimes called blow forming, is a technique for the forming of hollow plastic parts in which a body of plastics material, which may be formed by an extrusion process, is inserted in a mould which defines only the outer surface of the article to be formed and this body is then inflated by compressed air into contact with the internal walls of the mould to form the desired hollow article. The plastic is then allowed to cool and harden and is then ejected from the mould. Such a process is known as extrusion blow moulding and is economical to carry out compared with normal injection moulding where both the inside and outside surfaces of the article to be moulded must be defined by the mould which is therefore far more complex and expensive.

The housing 20 and door 21 can also be produced by rotation moulding in which a measured quantity of the polymer is loaded into the mould and the mould is heated and rotated about two or more axes until the polymer has melted and adhered to the mould wall. The mould is then cooled, usually by a fan, so that the polymer solidifies and shrinks in a controlled manner away from the mould to facilitate removal from the mould.

The invention claimed is:

1. A tractor cab filter housing having at least one air intake through which air is drawn into the housing, an outlet through which air leaves the housing, a filter element positioned between the inlet and outlet, and an opening access door through which the filter element can be accessed for servicing/replacement, the housing being characterised in that the access door is a hollow plastics moulding which includes an integral storage chamber having an access opening through which liquid or other items can be introduced into the storage chamber for storage therein, the opening having a closure member for closing of the opening.

2. A housing according to claim 1 provided with a pump for pumping liquid out of the storage chamber.

3. A housing according to claim 2 in which the pump is partly recessed within an outer surface of the door for protection against damage.

4. A housing according to claim 1 in which the door is detachable from the housing and is in two partially overlapping relatively slideable parts which, when the door is detached, can be slid apart to provide the access opening to the storage chamber within the door.

5. A housing according to claim 4 in which the two parts of the door are held in an assembled partially overlapping configuration by interengaging formations on the two parts.

6. A housing according to claim 4 in which the two parts of the door are initially formed in a single moulding operation, the parts then being cut apart and trimmed so that one part will slide inside the other part to provide the partially overlapping assembled configuration.

7. A housing according to claim 1 in which the access door is formed by a blow moulding or rotation moulding process.

* * * * *